July 31, 1962 E. J. SMITH 3,047,662

REMOTE STATION DIGITAL DATA TRANSMISSION SYSTEM

Filed March 22, 1960 7 Sheets-Sheet 1

Edgar J. Smith
INVENTOR.
BY Andrew L. Bain
ATTORNEYS

July 31, 1962 E. J. SMITH 3,047,662

REMOTE STATION DIGITAL DATA TRANSMISSION SYSTEM

Filed March 22, 1960 7 Sheets-Sheet 2

Edgar J. Smith
INVENTOR.

BY Andrew L. Bain

ATTORNEYS

Edgar J. Smith
INVENTOR.
BY Andrew L. Bain
ATTORNEYS

REMOTE STATION DIGITAL DATA TRANSMISSION SYSTEM

Filed March 22, 1960 7 Sheets-Sheet 4

Edgar J. Smith
INVENTOR.
Andrew L. Bain
BY [illegible]
ATTORNEYS

July 31, 1962 E. J. SMITH 3,047,662

REMOTE STATION DIGITAL DATA TRANSMISSION SYSTEM

Filed March 22, 1960 7 Sheets-Sheet 5

Edgar J. Smith
INVENTOR.

BY Andrew L. Bain

ATTORNEYS

Edgar J. Smith
INVENTOR.
BY Andrew L. Bain
ATTORNEYS

Edgar J. Smith
INVENTOR.

BY Andrew L. Bain

[signature]

ATTORNEYS

United States Patent Office 3,047,662

Patented July 31, 1962

3,047,662

REMOTE STATION DIGITAL DATA TRANSMISSION SYSTEM

Edgar J. Smith, Verona, N.J., assignor to General Precision, Inc., Little Falls, N.J., a corporation of Delaware Filed Mar. 22, 1960, Ser. No. 16,742
9 Claims. (Cl. 179—2)

This invention relates to devices for remotely reading of meters, such as gas meters and the like and is particularly directed to a device for converting and transmitting a momentary meter reading to digital form, transmitting the digital information to a remotely located point, and indicating numerically the meter reading at such remotely located point.

It is directed primarily to a device which can directly be connected to existing telephone lines, so that the digital data can be transmitted over existing telephone lines without requiring special wiring between the points at which the meters are located and the central readout station.

The system employed will handle any reasonable number of remotely located and separated meters, each meter being equipped with an analog to digital converter, or Adac, the digital information from the Adac being transmitted over conventional telephone lines using Bell System or similar telephone equipment, to a central receiving unit.

The central receiving unit is adapted to translate the information received, decode the information and convert it into its decimal equivalent and display the decimal equivalent on a decimal readout unit.

Instead of displaying the numerals on the decimal readout unit the decoded information can be fed into digital computing and automatic billing equipment, also the information, in the form of numerals can be typed out for permanent record by attaching an automatic printer, or automatically controlled typewriter to the console in place of or in conjunction with the decimal readout unit.

Thus an operator is enabled to instantly obtain in decimal form, a reading of one or a series of meters, located remotely from the operator, and to select the sequence at which the remotely located meters are read.

A feature of the device is that provision is made for the incorporation of error detection equipment, so that errors in the reading or in the computations, regardless of the cause thereof, may readily be detected by the operator.

With the present equipment it is necessary for an operator to physically read each meter at its location, and transmit the information to a central depot, either in person, or by telephone.

As it is necessary in many instances to read these meters daily, and in many instances several times a day, the cost of manual reading and transmission is extremely high.

Due to widely separated locations of the meters, the manual system is subject to the vagaries of the weather, such as rain, snow, and the like which interfere with physical travel from one meter location to another.

As the frequent meter readings are frequently required to determine the rate of consumption of illuminating gas, such as natural gas, accurate and frequent readings of the meters is essential to avoid periodic breakdowns, and overloads on the control stations and pumping equipment.

As the periods of maximum utilization of gas in domestic installations, coincides with bad weather, such as snow and rain, the necessity for frequent checks on industrial installations to determine rate of consumption is greatest when the difficulty of obtaining individual readings is greatest, as in snow, heavy rains, sleet and the like.

The primary feature of applicant's apparatus is that it provides accurate low cost readings of a plurality of metering stations in a short time interval and under control of a single operator.

Another feature is that the transmission of the data is accomplished over regular telephone lines, so that no special long distance wiring is required in installing the system.

Another feature is that the readings are transmitted in digital form, which may readily be transmitted over regular telephone lines, without alteration of the installed telephone cables.

Another feature is that all steps in the transmission of the data to a central station and the conversion thereof to readout figures is performed automatically, without any action on the part of the operator, other than the original initiation.

Another feature is that timing information is transmitted with each signal, thus enabling the operator to detect any errors in an individual reading and therefor discard or recheck an erroneous reading before any damage is done.

Another feature is that the readings as they appear in the central control room, are relatively large, illuminated and readily visible, so they may be recorded by inexperienced personnel, or photographed for permanent record on conventional photographic equipment, or printed by means of an automatic printer or typewriter unit. The data may also be punched in tape, or recorded by any other suitable means.

The accompanying drawings, illustrative of one embodiment of the invention, and several modifications thereof, together with the description of their construction, the circuitry used in conjunction therewith, and the method of operation, control, metering and utilization thereof, will serve to clarify further objects and advantages of my invention.

Figure 3:
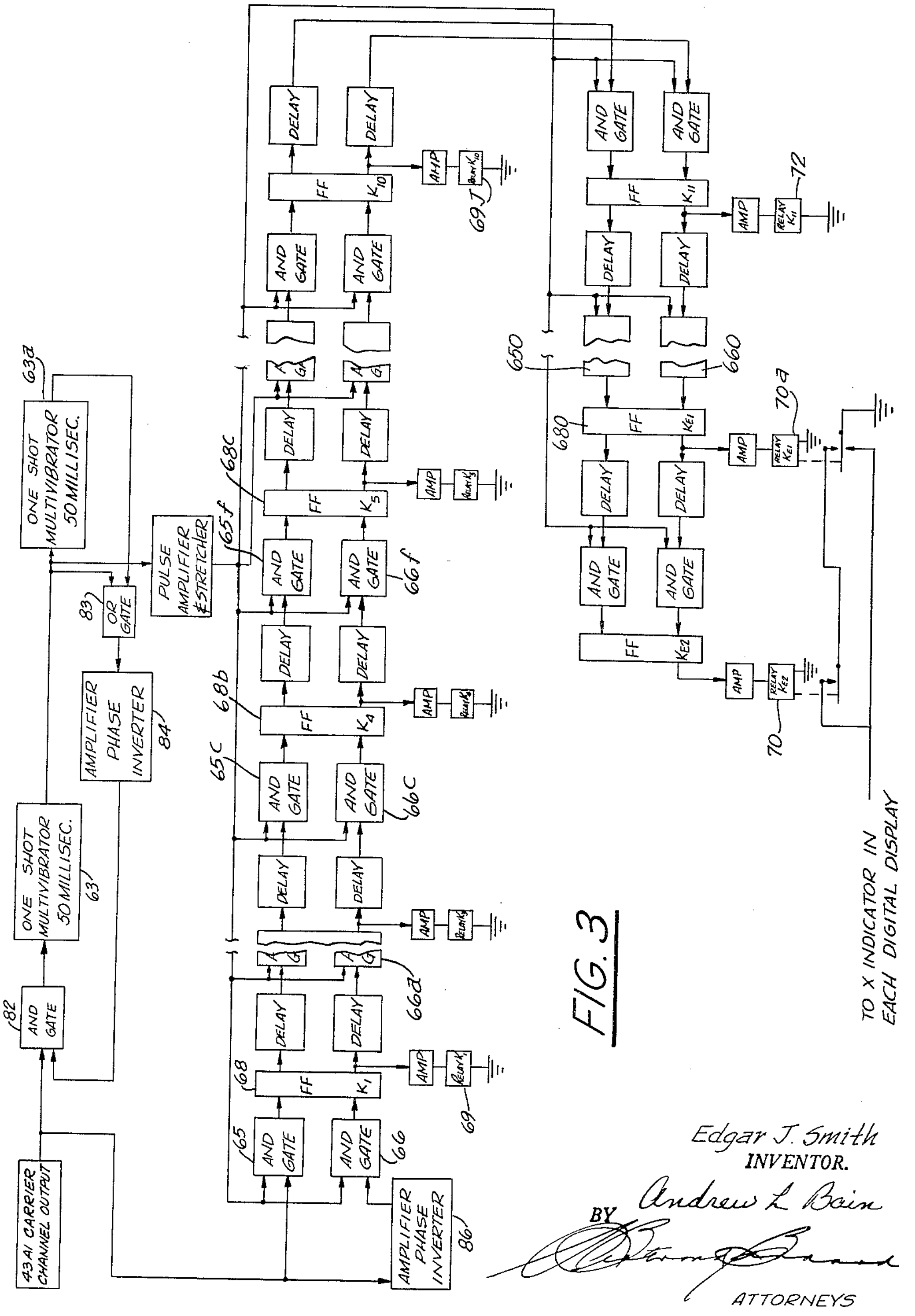
FIGURE 3 is a block diagram of a portion of the control station data receiver, which forms part of the control station apparatus, shown in FIGURE 1.

FIGURES *9a–9g*, represent diagram of the pulses transmitted over the telephone lines, and the effect of the various steps in the process of the pulses used for energizing the signals on the readout display console, as controlled by the circuit shown in FIGURE 3.

It will be understood that the following description of the construction and the method of mounting, attachment, wiring, control operation and utilization of the meter digital transmission and readout system is intended as explanatory of the invention and not restrictive thereof.

In the drawings, the same reference numerals designate the same parts throughout the various views, except where otherwise indicated.

Figure 1:
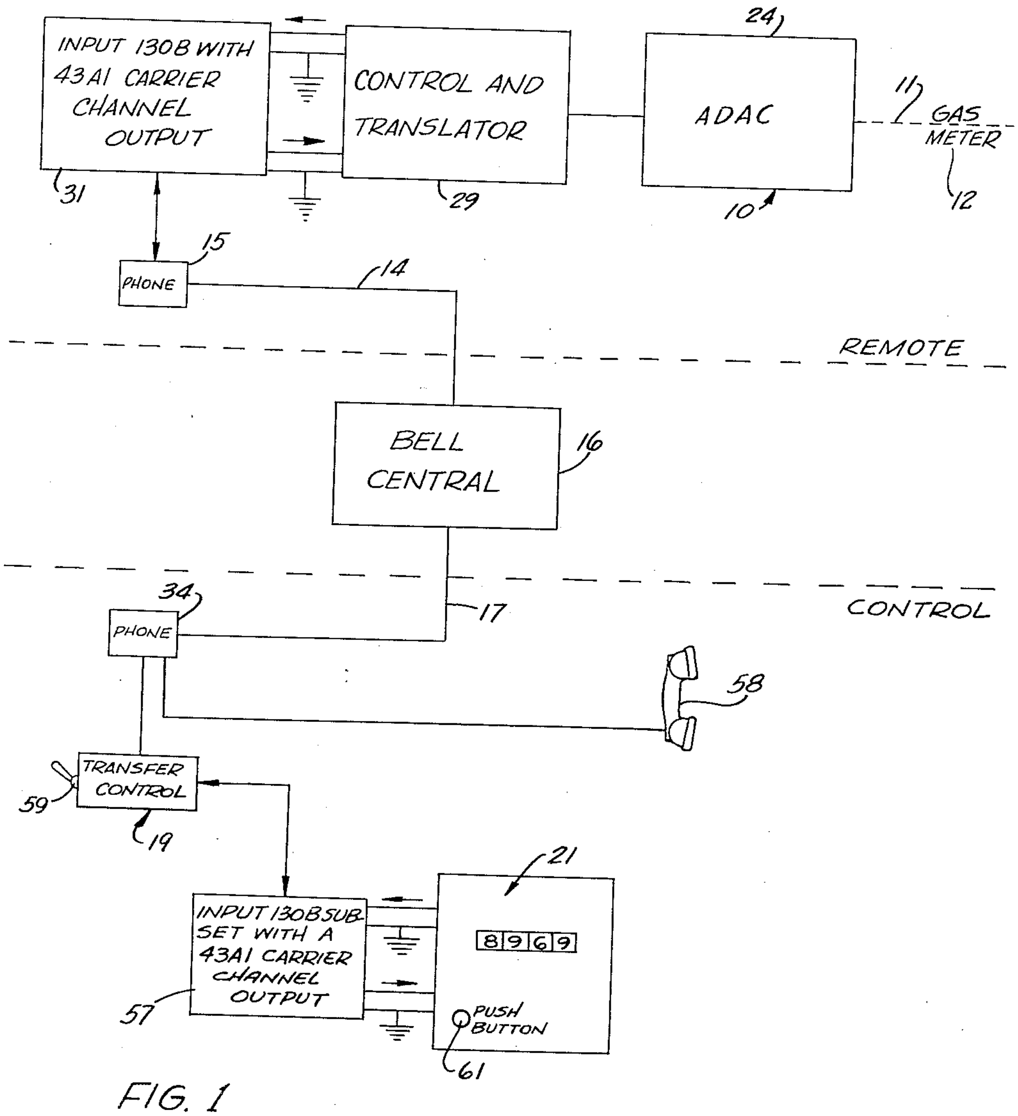
FIGURE 1 represents a functional diagram of the various portions of the apparatus, showing the meter equipment, and the control point readout equipment.

The apparatus shown in FIGURE 1, is generally broken up into three sections, including the remote unit 10, which is located at each installation, at which a meter, such as a gas meter 12 is to be read, which prepares digital data in a manner hereinafter described, and transmits it through the conventional telephone lines 14, leading from a telephone instrument 15, to the central office 16 of the telephone company, at which the digital data is processed in a manner hereinafter described, the data being transmitted through a telephone line 17, connected to the conventional type of telephone instrument and processed in the equipment, which is located at the operating control section 19, which may be located at the utility company's operational office, which is located a considerable distance from both the remote unit and the telephone central office.

In the control section, the digital data is processed in a manner hereinafter described, the meter reading being indicated on an illuminated readout instrument 21, such as that shown in FIGURE 1, and hereinafter described in greater detail.

Figure 7:
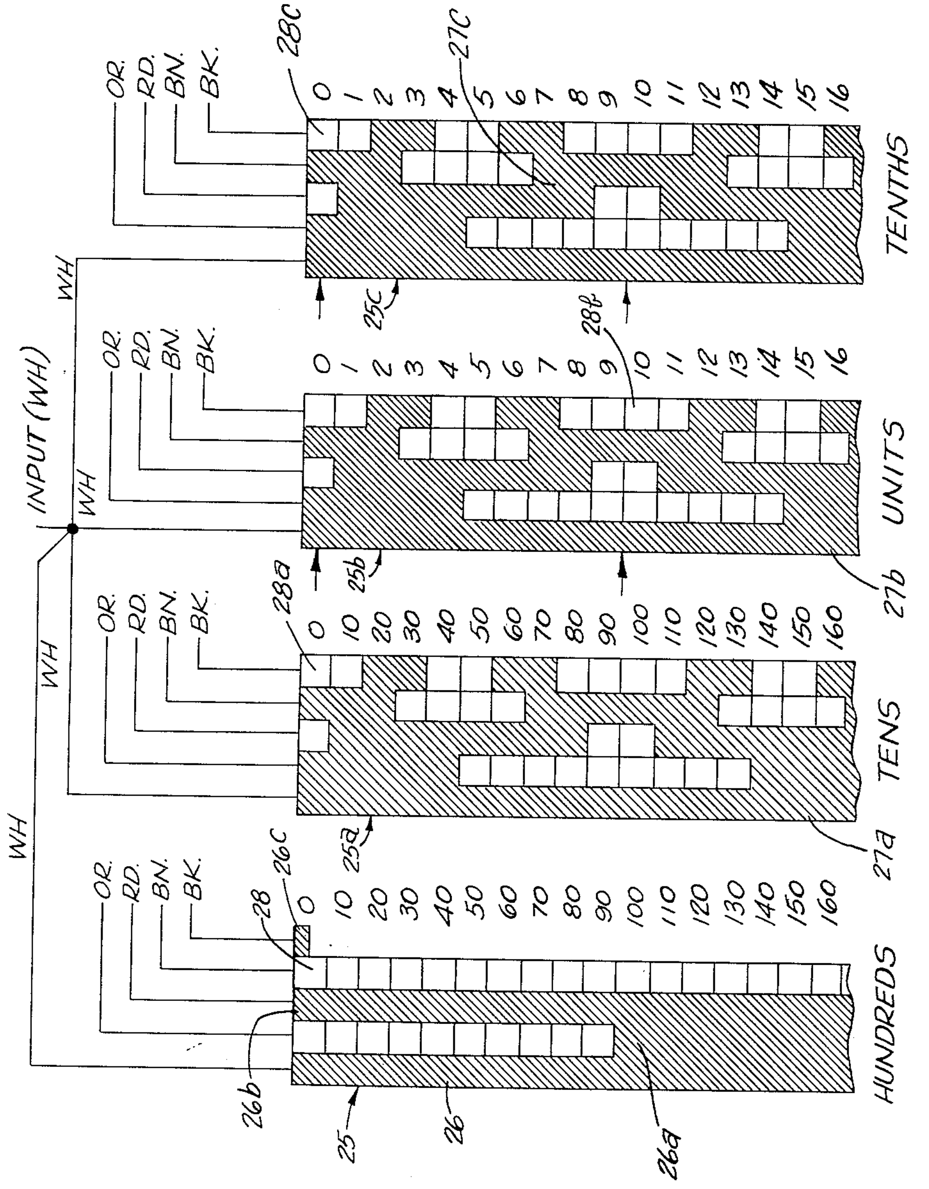
FIGURE 7 is a schematic diagram of the drums of the analog to digital converter, or Adac, shown in FIGURE 1.

At the individual stations in which the remote unit 10 is mounted, the transmission apparatus is attached to a conventional type of gas meter 12, or other type of meter, the indicator shaft 11 of the meter being directly connected or geared to the shaft of an analog to digital converter 24, which is a multiple drum device, such as that shown in FIGURE 7, for converting the angular position of the shaft 11 to a digital signal.

The shaft 11 of the metering mechanism drives the shaft of the digitalizer 24 to an angular position which is directly proportional to the quantity of gas, or other material being metered.

The digitalizer 24, which is shown in FIGURE 7, consists of a series of four drums 25, **25*a*, 25*b*, 25*c*, which are co-axial with the shaft 11**, the drums being rotated by individual gear trains so that they transmit a digital signal in units, tens, hundreds and thousands, in the form of digital signals in a binary code in a manner hereinafter described in greater detail.

Each of the drums 25, **25*a* has a plurality of circumferentially positioned metal inserts 26, 26*a*, 26*b*, 27, 27*a*, 27*b* fitted thereto, the metal surfaces of the inserts alternating with blank surfaces 28, 28*a*, 28*b*** formed by the plastic material of which the drum is made, to transmit electrically signals indicating the momentary angular position of each drum in a manner hereinafter described in greater detail.

The drums 25, **25*a*** are progressively and intermittently rotated by the drum drive shaft and the gear trains interconnecting the drums in such a manner as to provide a coded numeral. Thus, the lowest or tenths drum may be directly connected to the meter shaft. The other drums are interconnected by gear trains, which are initially driven by the tenths drum until a coded numeral in hundreds, tens, units and tenths is transmitted by the brushes.

Where larger quantities are required a fifth or thousandths drum may be added to the four drums shown in FIGURE 7.

The electrical signals from the drums of the digitalizer are transmitted to a control and translating unit 29, in which they are converted and transmitted through a carrier channel 31, in a manner hereinafter described in greater detail.

From the carrier channel 31, the converted signals are transmitted through a conventional telephone line to a conventional telephone instrument 15, located at the remote position, and from the telephone instrument, when connected along a telephone line, to a switchboard, or other type of apparatus at the central office 16, of the telephone company.

Figures 2, 6:
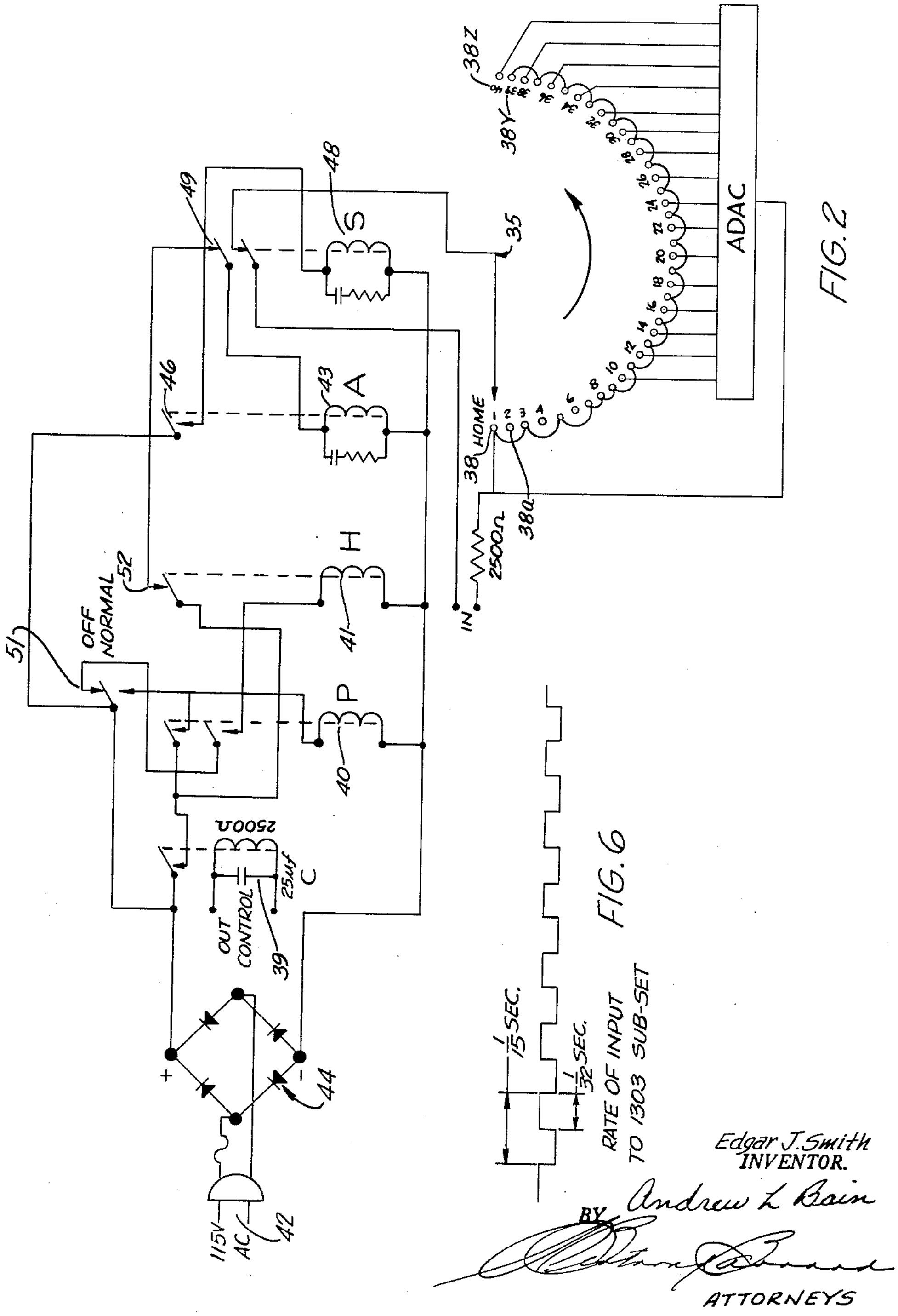
FIGURE 2 is a schematic wiring diagram of the control and translating unit, forming part of the remote reading section of the apparatus shown in FIGURE 1.
FIGURE 6 is a diagram of the pulse transmission rate used in transmitting the data over the telephone line.

When a particular station is checked, by dialing the number of the phone at the remote station 10, or by other suitable means, a stepping switch 35, such as that shown in FIGURE 2, will examine individually the sixteen readout brushes (not shown) of the digitalizer. The brushes are numerically aligned with the metal inserts 26, **26*a*, 27, 27*a* of the drums of the digitalizer. In this instance there is a total of four drums 25–25*c*, with four inserts 26–26*c*** to a drum, so that a total of sixteen possible signals are normally transmitted by the brushes, which engage the inserts on the digitalizer drums.

The picked off information is transmitted in parallel form to the control and translator unit 29.

The telephone company unit 31 will change the digital voltage levels into two discrete frequencies which are transmitted over the telephone equipment 14, 15, 16 and 17, to the conventional type of telephone receiver 34.

The telephone company unit 31 will change the digital voltage levels of the pulses, usually 0 volts D.C. and 50 volts D.C. into two discrete frequencies, which are transmitted over regular telephone lines to the control center receiver.

The control and translator 29 located at the remote station 10, which receives the data from the analog to digital converter 24, and converts it to electrical pulses, suitable for transmission into the channel output 31, and from it over the telephone lines, is shown in detail in FIGURE 2.

This consists of a 40 contact, or other suitable number of contacts spring-driven stepping switch 35, the individual contacts 38, **38*a* of which are connected to the individual brushes of the analog to digital converter, which receive the pulses from the inserts 26, 27** in the drums of the analog to digital converter.

A total of three control relays (A, P, H) 43, 40, 41, are connected between the current source, and the stepping switch 35 in a manner hereinafter described.

A fourth or out control relay (C) 39, which is used to initiate operation is powered from the carrier channel 31, shown in FIGURE 1.

The three relays 40, 41, 43 (P, H, A) are inserted into the line between a rectifier bridge power supply 44, and the stepping switch relay 48 (S).

The operation of this circuit, is substantially as follows:

The three relays (C, P, H) 39, 40, 41 are normally "On."

The signal through the telephone circuit de-energized the relay (C) 39, thus opening the relay (C) 39.

The opening of relay (C) 39, de-energizes the two relays (P and H) 40, 41.

When power input in relay (C) 39, is transmitted by means of a signal along the telephone lines, the current is able to pass through relay contacts (C and H) 39, 52, to relay (A) 43.

When relay (A) 43 is energized, contact (A) 46, which is mechanically coupled to relay (A) 43, is closed, thereby energizing the stepper switch relay (S) 48, which de-energizes the relay (A) 43 by the opening of contact (S) 49. When relay (S) 48 is de-energized caused by (A) 46 contact opening it closes contact (S) 49 which energized relay (A) 43.

When relay (S) 48 is initially de-energized, it transfers the off-normal switch 51, so that the relay (P) 40 can be energized and stay energized because of its contact (S) 48.

When relay (A) 43 is de-energized it opens contact (A) 46, and de-energizes relay (S) 48.

This cycle continues on an on-off basis, until all the contacts 37, **37*a*, 37*z* of the stepper switch 35, have received their signals from the corresponding brushes of the analog to digital converter 24**.

The unit will flip-flop, as described, until the end position of the contacts **38*y*, 38*z* of the stepper switch 35 is reached (when the off-normal switch 51 is transferred to the closed position). This allows the voltage to enter the relay (H) 41 through the contact of (P) 40, thereby opening the contact (H) 52, and in that manner preventing the voltage from going to the relay (A) 43**, thereby stopping all activity of the unit, until it is recycled in the manner hereinbefore described.

Figure 4:
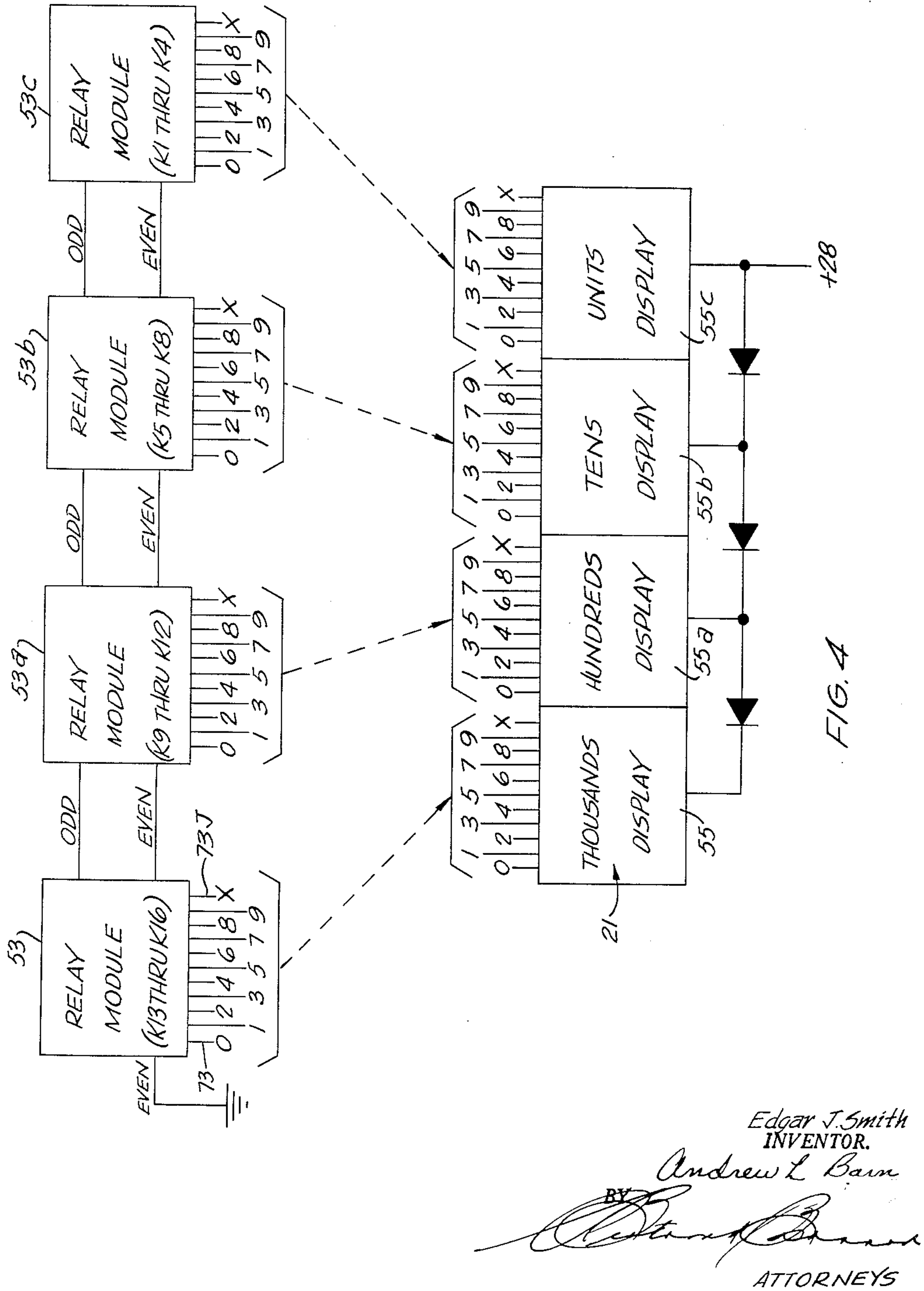
FIGURE 4 is a block diagram of the wiring circuit of the relay tree module and the display readout.
Figure 8:
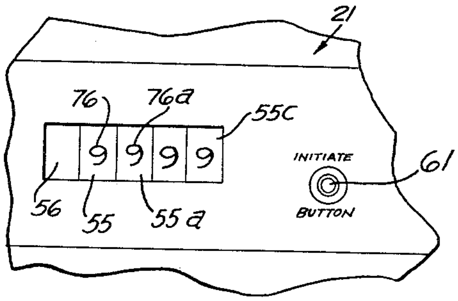
FIGURE 8 is a front elevational view of the display portion of the readout console, shown diagrammatically in FIGURE 1.

The control station receiver 21 which is shown in outline in FIGURE 1, and partially in FIGURE 8, consists primarily of a logical module, four relay tree transistor modules, 53, 53*a* as shown in FIGURE 4, a power supply, and a five digit digital readout 21 shown in FIGURES 1 and 8, the readout having an opening for displaying 5 digits, of which four right-hand numerals 55, 55*a*, or areas, are used for electrically displaying the reading, the reading, the left-hand area 56, being available primarily as a spare, although it can be used for error display, in a manner hereinafter described.

Connected to this console is a Bell System subset, with a carrier channel 57, fitted thereto, a telephone instrument 58, and a transfer switch control 59, all of which are shown schematically in FIGURE 1.

The telephone equipment such as the sub set, the carrier channel and the telephone are furnished by the telephone company.

Information is obtained from the analog to digital converter 24 attached to the selected meter 12, as shown in FIGURE 1, by dialing the number of the telephone at the particular station obtaining a return tone signal for the station, placing the transfer switch 59 in the console position, and depressing the initiate button 61, which is fitted to the display console 21, as shown in FIGURES 1 and 8.

When the initiate button is released, the remote stations 10, 29, 31 and 15 will transmit frequencies representing binary bits, to the Bell System unit 16. The received frequencies are changed into voltage pulses by the carrier channel 57, which are transmitted to the logical modules in the manner hereinbefore described. The logical modules will direct these pulses into flip-flop registers in the manner shown in FIGURE 3 and hereinafter described. The cyclic code is then transformed into the decimal equivalent form by the relay matrix in a manner hereinafter described.

The decimal information is then displayed on the digital readout unit 21 shown in FIGURES 1 and 8, by illuminating specific numerals designating the specific reading, or by any other suitable type of display mechanism which can be electrically controlled.

FIGURE 3 shows a block diagram of the console 21, shown in FIGURES 1 and 8.

*Logic Module and Error Detector*

The logical module and error detector, shown in FIGURE 3, consists of two one-shot multivibrators, 63, 63*a*, a total of 37 "and" gates 65*a*, 65*b*, 65*c*, 66*a*, 66*b*, 66*c*, a total of 18 flip flop registers 68, 68*a*, including 16 connected to the relays 69, 69*j*, 72—72*e* (K–1—K–16), shown in FIGURES 2 and 3, and two connected to the error relays 70, 70*a* (*ke*1) (*ke*2) shown at the left-hand side, FIGURE 3, the function of which is hereinafter described, ten delay drivers, and pulse shaping circuitry which is hereinafter described.

An error detection mechanism is incorporated in the device to indicate any malfunction at points along the line, any erroneous information received, or transmitted being detected by this mechanism. To accomplish this result, two additional bits of information are processed, with the signals received from the analog to digital converter 24. If these bits, or signals are not carried through the control station logic correctly, the relay circuit will cause the error to be read out as "x" on all of the signal columns 56, of the digital readout unit, shown in FIGURES 1 and 8.

*Relay Tree Module and Error Detector*

FIGURE 4 shows a block diagram of this circuit.

The relay tree transistor, which contains four relay modules 53, 53*a* each consisting of four relays (K1—K4) 69, 69*j* (K13—K16) 72, 72E and ten diodes 73, 73*j* is arranged to honor only ten codes per digit. If any of the illegitimate codes are sensed, that digit is displayed as an "x" in the appropriate digit position 56, 55 of the readout display 21 shown in FIGURES 1 and 8.

*Digital Readout Unit*

This unit 21, which is shown in FIGURE 8, will present a decimal display by lighting appropriate numbers 76, 76*a*, which are energized by the respective pulses. This unit contains an error display, which is represented by the lighting of an "x" in one of the display areas 55, 55*a*, instead of a decimal digit.

While used for displaying only four figures it has a blank column 56, at the left-hand end to allow for an extra digit if larger quantities or increased resolution is required at some future time.

Two of the relays 70, 70*a*, shown at the lef-hand side FIGURE 3, are used for error detecting and checking, these relays controlling the display of an "x" on all columns of the digital readout unit shown in FIGURE 8.

FIGURES 9A–9G show diagrammatically the pulses transmitted at various stages of the cycle of operations.

A time constant 75, shown in FIGURE 9, is built into the circuit shown in FIGURE 3.

Figures 9A, 9B, 9C, 9D, 9E, 9F, 9G:
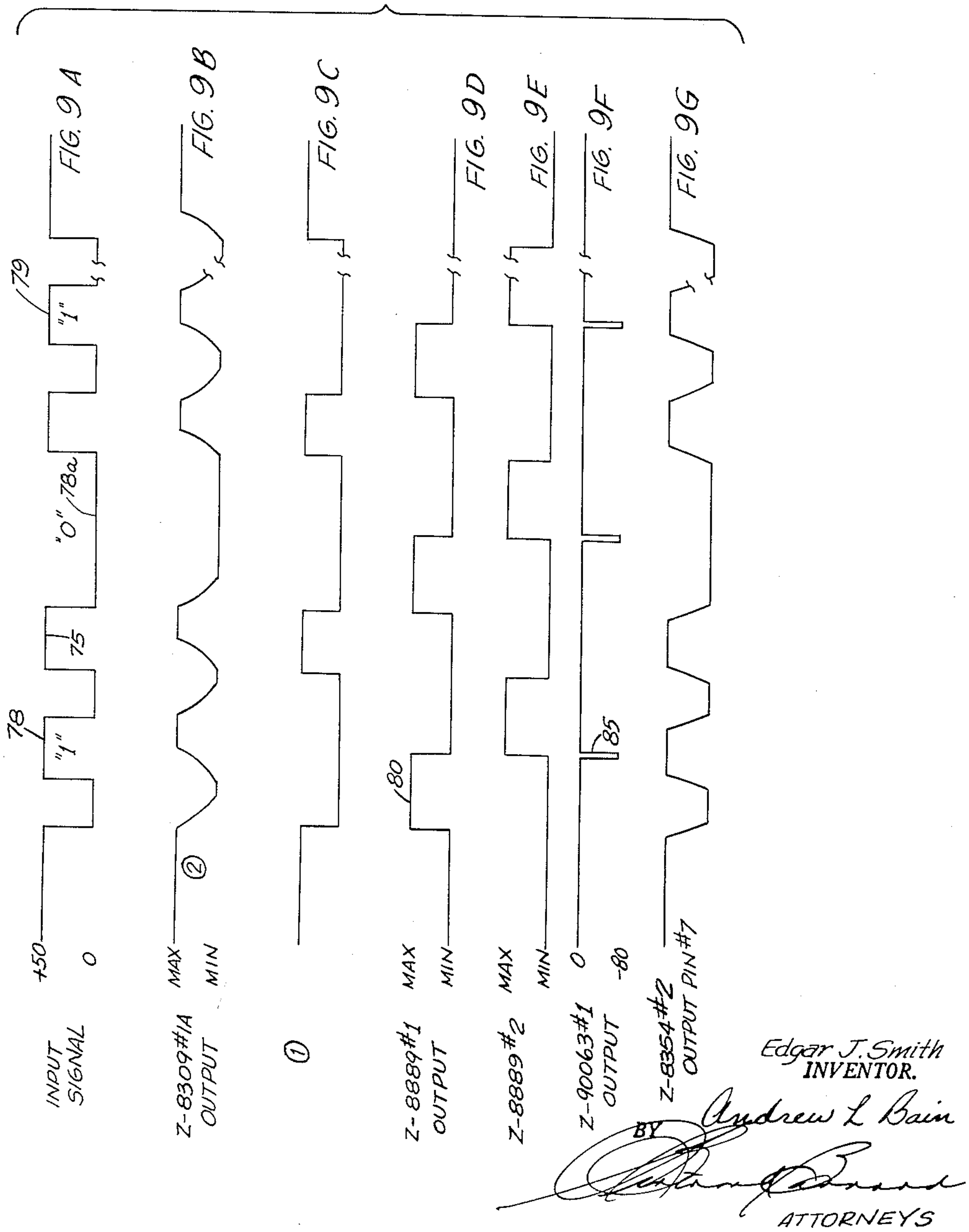

The signal received from the analog digital computer comes to the form shown in FIGURE 9A.

In this signal, a timing bit 75, is introduced between each pair of information bits 78, 78*a*.

By filtering the signals, the contour of the various signals is altered to substantially the contour shown in FIGURE 9B. This eliminates the effects of relay bounce, or other effects which would tend to cause an error in the figures.

The negative pulses trigger a one-shot multi-vibrator 63, and provide the pulse contour 80 shown in FIGURE 9D.

When the pulse goes negative, down stroke, it triggers a second one-shot multi-vibrator 63*a*, shown in FIGURE 3.

In order to open the "and" gate 82, shown in FIGURE 3, both of these signals are necessary.

Either of the signals can trigger the or-gate 83, shown in FIGURE 3.

The signal is then sent through a phase inverter amplifier 84, from the or-gate. This amplifier provides a low voltage signal.

The information pulse alone cannot trigger the one-shot multi-vibrator 63.

The one-shot multi-vibrator 63 is triggered by the negative stroke of the timing pulse.

When the second one-shot multi-vibrator 63*a* goes positive, it triggers a thyratron tube.

The thyratron tube triggers a sharp pulse 85, shown in curve 9F.

Each of the flip-flops 68, 68*o* is preceded by a pair of "and" gates 65, 65*o*, 66, 66*o*.

Information is necessary on both inputs, including a triggering pulse and a signal pulse.

These two pulses combine to open the "and" gate.

A phase inverter 86, is located in front of one of the first pair of "and" gates 65, 66 one a high "and" gate, and the second a low "and" gate.

If information is received on the pulses, the upper "and" gate 65 is high and the lower "and" gate 66 low.

If information received is zero, the lower "and" gate 66 is high and the upper "and" gate 65 low.

The signal sets the flip-flop 68 in the one station, the flip-flops 68*a*, 68*b*, 68*o*, being likewise energized.

The relay 69 (K) will be energized if the zero state relay is off.

The shift between flip-flops 68, 68*a* occurs at the trigger pulse.

The trigger pulses move the signal from one flip-flop 68 to the next.

The serial information is thus converted back to parallel signals.

The state of the relay, 69, 69*j*, 72—72*e* determined the decimal or numeral 76, 76*a* appearing on the digital readout 21.

When a reading of the meter 12 is taken, in the manner hereinbefore described, the analog to digital converter or Adac, serves not only as an analog to digital converter, but also as a storage device, so that when a reading is taken, it indicates not only the angular position of the shaft of the analog to digital converter, but the cumulative rotation of the shaft 11 from its nominal or initial position.

The pulse information is transmitted in a cyclic binary code, which ranges from 0001 for 1 to 1101 for 9 and 1111 for 10.

This is a four bit code converted to decimals.

Figure 5:
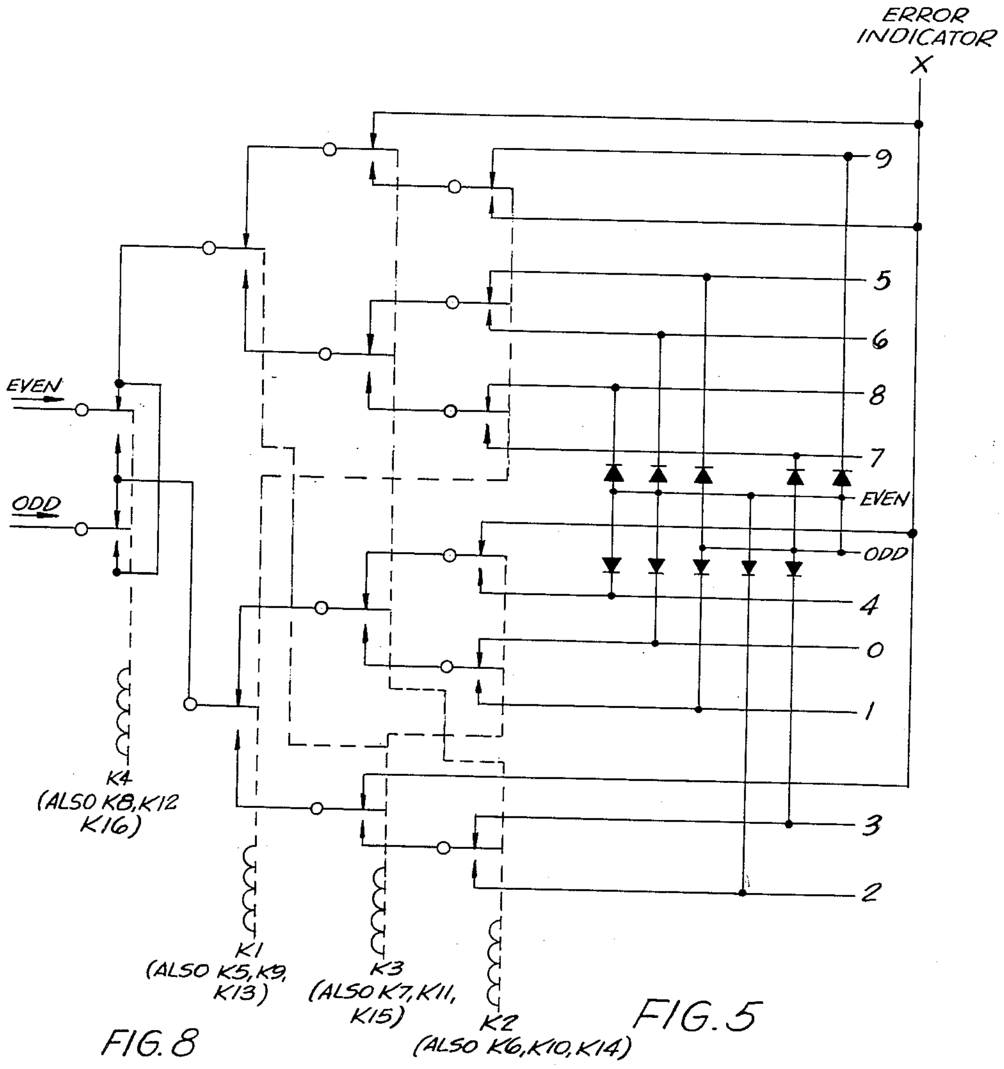
FIGURE 5 is a schematic wiring circuit of one of the relay modules, shown in FIGURE 4.

In order to control the circuit shown in FIGURE 5, it is necessary to know whether the signal received is "odd" or "even."

The number signal grounds the light signals shown in FIGURE 8 progressively from left to right, thus causing the selected signal numeral to be progressively illuminated until a four digit numeral is revealed.

It will be apparent to those skilled in the art, that the present invention is not limited to the specific details described above and shown in the drawings, and that various modifications are possible in carrying out the features of the invention and the operation and the method of support, control wiring and utilization thereof, without departing from the spirit and scope of the appended claims.

What is claimed is:

1. A data transmission system for use in combination with a meter having a rotating shaft adapted to indicate by angular shaft position, the quantity of fluid passing through the meter during a predetermined time interval, comprising an analog to digital converter having a rotating shaft, operatively connected to the meter shaft, said analog to digital converter being adapted to convert the momentary angular position of the meter shaft to an electrical digital signal, means adapted to convert the digital signal to electrical signal voltages suitable for transmission over conventional telephone lines, a conventional telephone instrument adapted to transmit said electrical signal voltages to a remotely located central receiving station, a second telephone instrument located at said central receiving station, adapted to receive the converted electrical signal voltage, means adapted to convert the electrical signal voltage received from the second telephone instrument, to a plurality of numerical electrical signal pulses operative to control a numerical display mechanism, an electrically controlled numerical display mechanism located in the central receiving station and connected to the second telephone instrument, and means mounted in said numerical display mechanism adapted to display numerical figures, co-ordinated with the momentary angular positions of the meter shaft, under control of the electrical signals received over the second telephone instrument, the analog to digital converter including a plurality of rotatable interconnected drums mounted co-axially with the meter shaft, one of said drums being directly coupled to the meter shaft, each of said drums having a plurality of substantially parallel progressively angularly positioned metal inserts around the outer circumference thereof, a plurality of brushes mounted adjacent the drums, each of said brushes being adapted to transmit an electrical pulse signal from one row of inserts, said drum inserts being adapted to transmit electrical digital signals in binary code through said brushes, a stepping switch having a plurality of contacts, co-ordinated with the number of brushes, one of the contacts of the stepping switch being connected to each of said brushes, said stepping switch being adapted to examine individually the electrical pulse signals received from said brushes, and transmit said electrical pulse signals, to an external point.

2. A data transmission system for use in combination with a meter having a rotating shaft adapted to indicate by angular shaft position, the quantity of fluid passing through the meter during a predetermined time interval, comprising an analog to digital converter having a rotating shaft, operatively connected to the meter shaft, said analog to digital converter being adapted to convert the momentary angular position of the meter shaft to an electrical digital signal, means adapted to convert the digital signal to electrical signal voltages suitable for transmission over conventional telephone lines, a conventional telephone instrument adapted to transmit said electrical signal voltages to a remotely located central receiving station, a second telephone instrument located at said central receiving station, adapted to receive the converted electrical signal voltage, means adapted to convert the electrical signal voltage received from the second telephone instrument to a plurality of numerical electrical signal pulses operative to control a numerical display mechanism, an electrically controlled numerical display mechanism located in the central receiving station and connected to the second telephone instrument, and means mounted in said numerical display mechanism adapted to display numerical figures, co-ordinated with the momentary angular positions of the meter shaft, under control of the electrical signals received over the second telephone instrument, the analog-digital converter including a plurality of rotatable progressively interconnected drums mounted coaxially with the meter shaft, one of said drums being directly coupled to the meter shaft, each of said drums having a plurality of rows of digital signal transmitting means surrounding the outer circumference thereof, a plurality of brushes mounted adjacent said drums, each of said brushes being adapted to transmit an electrical pulse signal from one row of digital signal transmitting means, said digital signal transmitting means being adapted to transmit digital signals in binary code through said brushes, a stepping switch having a plurality of contacts, co-ordinated with the number of brushes, and the digital transmission means, one of the contacts of the stepping switch being connected to each of said brushes, said stepping switch being adapted to examine individually the electrical pulse signals received from said brushes, and transmit said electrical pulse signals, to an external point.

3. A data transmission system for use in combination with a meter having a rotating shaft adapted to indicate by angular shaft position, the quantity of fluid passing through the meter during a predetermined time interval, comprising an analog to digital converter having a rotating shaft, operatively connected to the meter shaft, said analog to digital converter being adapted to convert the momentary angular position of the meter shaft to an electrical digital signal, means adapted to convert the digital signal to electrical signal voltages suitable for transmission over conventional telephone lines, a conventional telephone instrument adapted to transmit said electrical signal voltages to a remotely located central receiving station, a second telephone instrument located at said central receiving station, adapted to receive the converted electrical signal voltage, means adapted to convert the electrical signal voltage received from the second telephone instrument to a plurality of numerical electrical signal pulses operative to control a numerical display mechanism, an electrically controlled numerical display mechanism located in the central receiving station and connected to the second telephone instrument, and means mounted in said numerical display mechanism adapted to display numerical figures, co-ordinated with the momentary angular positions of the meter shaft, under control of the electrical signals received over the second telephone instrument, the analog-digital converter including a plurality of rotatable progressively interconnected drums mounted co-axially with the meter shaft, one of said drums being directly coupled to the meter shaft, each of said drums having a plurality of rows of digital signal transmitting means surrounding the outer circumference thereof, a plurality of brushes mounted adjacent said drums, each of said brushes being adapted to transmit an electrical pulse signal from one row of digital signal transmitting means, said digital signal transmitting means being adapted to transmit digital signals in binary code through said brushes, a stepping switch having a plurality of contacts, co-ordinated with the number of brushes, means for translating the picked-off pulse signals from selected brushes, through the stepper switch, to electrical signal bits in serial form, and transferring said signal bits to a control and translating unit, means for inserting a timing pulse between each pair of digital signal bits, means for changing the digital signal pulse voltage levels of the signals into two discrete frequencies suitable for transmission over a telephone line, means for transmitting the converted signal voltage to the second telephone instrument at the central receiving station.

4. A data transmission system for use in combination with a meter having a rotating shaft, adapted to indicate by angular position, the quantity of fluid passing through the meter during a pre-determined time interval, comprising an analog to digital converter having a rotating shaft operatively connected to the meter shaft, the analog to digital converter including a plurality of rotatable progressively interconnected drums, mounted co-axially with the meter shaft, one of said drums being directly coupled to the meter shaft, each of said drums having a plurality of rows of circular segmental digital transmitting means, surrounding the outer circumference thereof, a plurality of brushes mounted adjacent said drums, each of said brushes being adapted to transmit an electrical pulse signal from one row of digital signal transmitting means, said digital signal transmitting means being adapted to transmit digital signals in binary code through said brushes, a control and translator unit including a multiple contact spring driven stepper switch connected to the brushes, the individual contacts of said stepper switch being serially connected to the individual brushes, a current source, a plurality of control relays connected between the current source and the stepper switch, a rectifier bridge power supply connected to the current source, an additional time delay relay connected between the power supply and the control relays, a contact connected to each of said control relays, a stepper switch relay connected to the stepper switch, an off-normal switch connected to the contacts of the control relays, said circuit being adapted to provide electrical pulse cycles on an on-off basis until all of the contacts of the stepper switch have received their signals from the brushes, the off-normal switch being closed when the end position of the stepper switch contacts is reached, means adapted to convert the digital signal pulses from the control and translator unit, to electrical pulse signal voltages suitable for transmission over conventional telephone lines, a first conventional telephone instrument adapted to transmit said converted electrical signal voltage pulses to a remotely located central receiving station, a second telephone instrument located at said central receiving station, adapted to receive the converted electrical signal voltage pulses, means adapted to convert the electrical signal voltage pulses received from the second telephone instrument to a plurality of numerical electrical signal pulses adapted to activate an electrically controlled numerical display mechanism located at the control station and connected to the second telephone instrument, and means mounted in said numerical display mechanism adapted to display numerals, co-ordinated with the momentary angular positions of the meter shaft under control of the electrical signal voltage pulses received over the second telephone instrument.

5. In combination with a data transmission system, as in claim 4, a control station receiver located at the central receiving station, said control station receiver being adapted to receive the converted signal voltage pulses from the second telephone instrument, said control station receiver including a logical module, a plurality of relay modules, a power supply, the numerical display mechanism being a multiple digital readout, having a series of digits corresponding to the number of relay modules, said digital readout being adapted to numerically display a number corresponding to the momentary angular position of the meter shaft.

6. A data transmission system for use in combination with a meter having a rotating shaft, adapted to indicate by angular shaft position the quantity of fluid passing through the meter, during a predetermined time interval, comprising an analog to digital converter having a rotating shaft operatively connected to the rotating meter shaft, means adapted to convert the digital signals to electrical signal voltage pulses suitable for transmission over conventional telephone lines, a first conventional telephone instrument adapted to transmit said converted electrical signal voltage pulses to a remotely located central receiving station, a second telephone instrument located at said central receiving station, adapted to receive the converted electrical voltage signal pulses, means adapted to convert electrical signal voltage pulses received from the second telephone instrument to a plurality of numerical electrical signal pulses, a multiple digit electrically controlled digital readout located in the central receiving station, the numerical signal pulses being adapted to selectively control the multiple digit digital readout, a control station receiver located at the central receiving station, said control station receiver being adapted to receive the signal pulses from the second telephone instrument, said control station receiver including a logical module, a plurality of relay tree transistor modules connected to the logical module, the logical module being adapted to selectivity control the relay tree modules, a power supply for electrically energizing the logical module and the relay tree modules, the multiple digit digital readout having a series of digits corresponding to the number of relay tree modules, said digital readout being adapted to display an illuminated number, corresponding to the momentary angular position of the meter shaft, each of the relay tree modules being directly connected to and controlling the selection of one of the digits in the multiple digit readout, a telephone system subset connected to the digital readout, said telephone system subset including a carrier channel, and a transfer control switch, said transfer control switch being adapted to control the operation of the telephone system subset, the digital readout having a control button fitted thereto, adapted to initiate the operation of the digital readout.

7. A data transmission system for use in combination with a meter having a rotating shaft, adapted to indicate by angular shaft position the quantity of fluid passing through the meter, during a predetermined time interval, comprising an analog to digital converter having a rotating shaft operatively connected to the rotating meter shaft, means adapted to convert the digital signals to electrical signal voltage pulses suitable for transmission over conventional telephone lines, a first conventional telephone instrument adapted to transmit said converted electrical signal voltage pulses to a remotely located central receiving station, a second telephone instrument located at said central receiving station, adapted to receive the converted electrical voltage signal pulses, means adapted to convert the electrical signal voltage pulses received from the second telephone instrument to a plurality of numerical electrical signal pulses, a multiple digit electrically controlled digital readout located in the central receiving station, the numerical signal pulses being adapted to control the multiple digit digital readout, the means adapted to convert the electrical signal voltage pulses from the second telephone instrument including a control station receiver located at the central receiving station, said control station receiver including a logical module, a plurality of relay tree modules connected to the logical module, the logical module being adapted to selectively control the relay tree modules, a power supply for electrically energizing the logical module and the relay tree modules, the multiple digit digital readout having a series of digits corresponding to the number of relay tree modules, said digital readout being adapted to display an illuminated number, corresponding to the momentary angular position of the meter shaft, each of the relay tree modules being directly connected to and controlling the selection of one of the digits in the multiple digit readout, a telephone system subset connected to the digital readout, said telephone system subset including a carrier channel, and a transfer control switch, said transfer control switch being adapted to control the operation of the telephone system subset, the digital readout having an initiate control button fitted thereto, said initial control button being adapted to initiate the operation of the digital readout numeral display.

8. A data transmission system for use in combination with a meter having a rotating shaft adapted to indicate by angular shaft position the quantity of fluid passing through the meter, during a predetermined time interval, comprising an analog to digital converter having a rotating shaft operatively connected to the rotating meter shaft, means adapted to convert the digital signals to electrical signal voltage pulses suitable for transmission over conventional telephone lines, a first conventional telephone instrument adapted to transmit said converted electrical signal voltage pulses to a remotely located central receiving station, a second telephone instrument located at said central receiving station, adapted to receive the converted electrical voltage signal pulses, means adapted to convert the electrical signal voltage pulses received from the second telephone instrument to a plurality of numerical electrical signal pulses, a multiple digit electrically controlled digital readout located in the central receiving station, the numerical signal pulses being adapted to control the multiple digit digital readout, the digital readout being adapted to display illuminated numerical figures, co-ordinated with the momentary angular position of the rotating meter shaft, the means adapted to convert the electrical signal voltage pulses from the second telephone instrument including a control station receiver located at the central receiving station, a telephone system subset connected to the digital readout, said telephone system subset including a carrier channel, and a transfer control switch, said transfer control switch being adapted to control the operation of the telephone system subset, the digital readout having a control button fitted thereto, adapted to initiate the operation of the digital readout, the means adapted to convert the electrical signal voltage pulses received from the second telephone instrument to a plurality of numerical electrical signal pulses including a carrier channel, a plurality of logical modules connected to the carrier channel, adapted to receive the converted voltage pulses, a plurality of flip-flop registers connected to the logical modules, a relay matrix connected to and controlled by the flip-flop registers operative to convert the converted cyclic code voltage pulses into decimal equivalent form, the decimal equivalent signals controlling the individual digits of the digital readout, the decimal equivalent information being displayed on the digital readout by a series of illuminated numerals.

9. A data transmission system for use in combination with a meter having a rotating shaft adapted to indicate by angular shaft position the quantity of fluid passing through the meter, during a predetermined time interval, comprising an analog to digital converter having a rotating shaft operatively connected to the rotating meter shaft, means adapted to convert the digital signals to electrical signal voltage pulses suitable for transmission over conventional telephone lines, a first conventional telephone instrument adapted to transmit said converted electrical signal voltage pulses to a remotely located central receiving station, a second telephone instrument located at said central receiving station, adapted to receive the converted electrical voltage signal pulses, a carrier channel adapted to convert the electrical signal voltage pulses received from the second telephone instrument to a plurality of numerical electrical signal pulses, a multiple digit electrically controlled digital readout located in the central receiving station, the numerical signal pulses being adapted to control the multiple digit digital readout, a control station receiver located at the central receiving station, said control station receiver being adapted to receive the signal pulses from the second telephone instrument, said control station receiver including a logical module, a plurality of relay tree transistor modules connected to the logical module, the logical module being adapted to selectively control the relay tree modules, a power supply for electrically energizing the logical module and the relay tree modules, the multiple digit digital readout having a series of digits corresponding to the number of relay tree modules, said digital readout being adapted to display an illuminated number, corresponding to the momentary angular position of the meter shaft, each of the relay tree modules being directly connected to and controlling the selection of one of the digits in the multiple digit readout, a telephone system subset connected to the digital readout, said telephone system subset including a carrier channel, and a transfer control switch, said transfer control switch being adapted to control the operation of the telephone system subset, the digital readout having a control button fitted thereto adapted to initiate the operation of the digital readout, the carrier channel adapted to convert the electrical signal voltage pulses from the second telephone instrument to a plurality of electrical signal pulses being connected to a logical module and error detector, said logical module and error detector including a plurality of logical modules connected to the carrier channel, said logical modules being adapted to receive the converted voltage pulses, an error detector device incorporated with said logical modules, said logical module and error detector including a plurality of multi-vibrators, a plurality of "and" signal gates directly connected to the multi-vibrators and controlled thereby; a plurality of flip-flop registers individually connected to the "and" signal gates, a plurality of relays individually connected to the flip-flop registers, a pair of error relays individually connected to a mating pair of selected flip-flop registers, and an error detection mechanism connected to and controlled by the error relays, said error detection mechanism being operative to indicate any error in the transmission of pulse signals through the apparatus.

References Cited in the file of this patent

UNITED STATES PATENTS

| | | |
|---|---|---|
| 1,804,576 | Waite | May 12, 1931 |
| 2,802,138 | Tompkins | Aug. 6, 1957 |
| 2,870,258 | Cooper | Jan. 20, 1959 |
| 2,953,777 | Gridley | Sept. 20, 1960 |
| 2,957,046 | Freeman et al. | Oct. 18, 1960 |

OTHER REFERENCES

"Translator T–121," by Daytex, Bulletin No. 121, issued Feb. 1, 1960.